US007046315B2

(12) United States Patent
Kim et al.

(10) Patent No.: US 7,046,315 B2
(45) Date of Patent: May 16, 2006

(54) ARRAY SUBSTRATE OF LIQUID CRYSTAL DISPLAY DEVICE HAVING COLOR FILTER ON THIN FILM TRANSISTOR STRUCTURE AND METHOD OF FABRICATING THE SAME

(75) Inventors: Woong-Kwon Kim, Kyonggi-do (KR); Se-June Kim, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 45 days.

(21) Appl. No.: 10/629,741

(22) Filed: Jul. 30, 2003

(65) Prior Publication Data

US 2004/0109098 A1    Jun. 10, 2004

(30) Foreign Application Priority Data

Dec. 6, 2002    (KR) ............... 10-2002-0077424
Jul. 4, 2003    (KR) ............... 2003-045418

(51) Int. Cl.
    *G02F 1/136*    (2006.01)
(52) U.S. Cl. ............... 349/44; 349/41; 349/42; 349/43; 349/106
(58) Field of Classification Search ........... 349/41–44, 349/106
    See application file for complete search history.

(56) References Cited

U.S. PATENT DOCUMENTS 6,208,399 B1 * 3/2001 Ohta et al. .......... 349/139
6,373,540 B1 * 4/2002 Munakata .......... 349/117
6,545,730 B1 * 4/2003 Hwang ............... 349/43

* cited by examiner

*Primary Examiner*—Andrew Schechter
*Assistant Examiner*—George Y. Wang
(74) *Attorney, Agent, or Firm*—McKenna Long & Aldridge LLP

(57) ABSTRACT

An array substrate of a liquid crystal display device having a color filter on a thin film transistor structure and a method of fabricating the same are disclosed in the present invention. The liquid crystal display device having a COT structure array substrate includes a top gate type thin film transistor formed on a substrate and having an active layer, a gate electrode, a source electrode, and a drain electrode, a storage capacitor adjacent to the top gate type thin film transistor and having a first storage electrode and a second storage electrode, a black matrix on the top gate type thin film transistor, a first pixel electrode at a pixel region and contacting a drain electrode, a color filter on the first pixel electrode at the pixel region, and a second pixel electrode on the color filter and contacting the first pixel electrode at the portion over the black matrix.

33 Claims, 13 Drawing Sheets

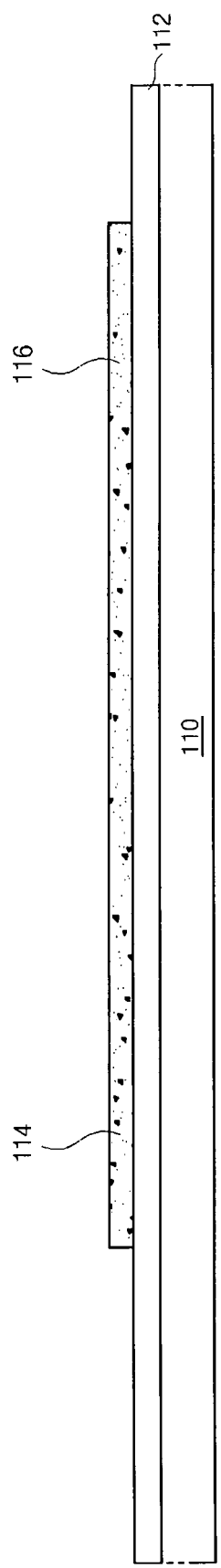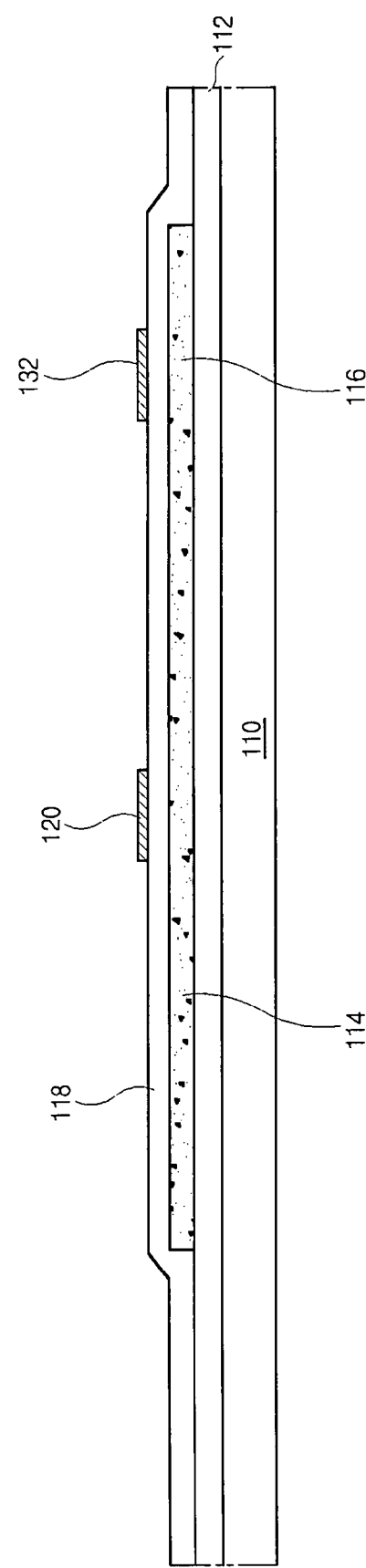

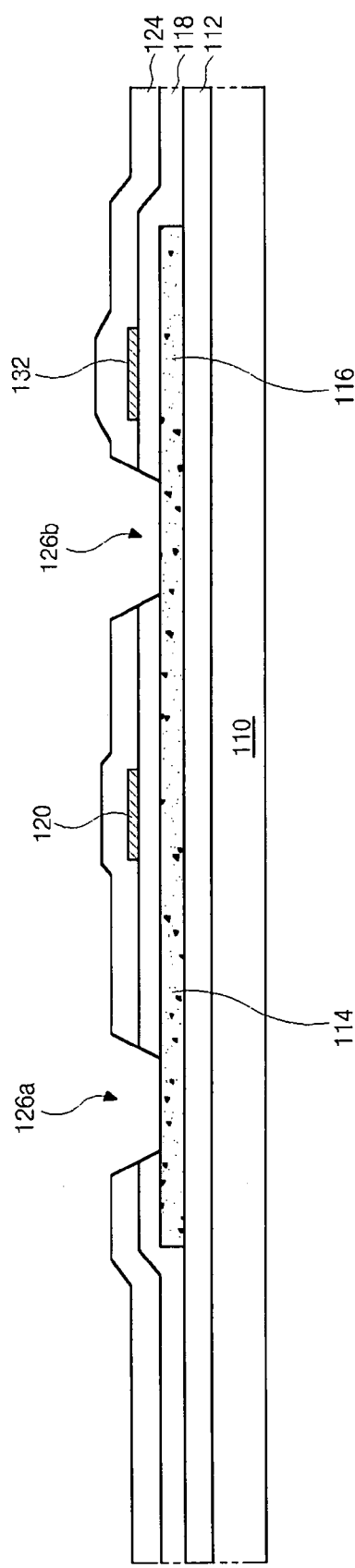
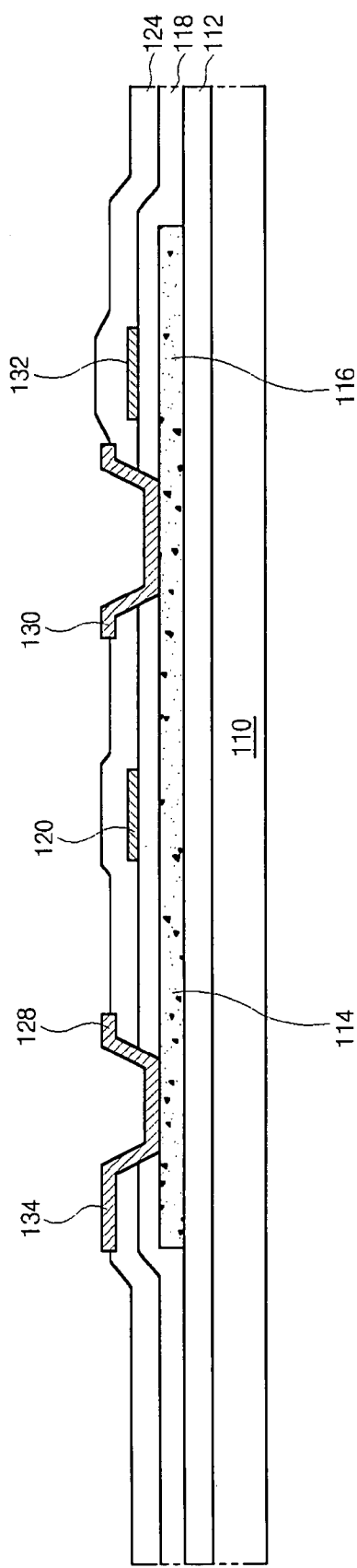
FIG. 7C
FIG. 7D

US 7,046,315 B2

ARRAY SUBSTRATE OF LIQUID CRYSTAL DISPLAY DEVICE HAVING COLOR FILTER ON THIN FILM TRANSISTOR STRUCTURE AND METHOD OF FABRICATING THE SAME

This application claims the benefit of the Korean Application Nos. P2002-077424 filed on Dec. 6, 2002, and P2003-045418 filed on Jul. 4, 2003, which are hereby incorporated by reference.

BACKGROUND OF THE INVENTION

1. Field of the Invention

The present invention relates to a liquid crystal display device, and more particularly, to a liquid crystal display device having a color filter on thin film transistor structure and a method of fabricating the same. Although the present invention is suitable for a wide scope of applications, it is particularly suitable for increasing an aperture ratio and simplifying the fabrication process.

2. Discussion of the Related Art

In general, since flat panel display devices are thin, light weight, and have a low power consumption, they have been used for portable display devices. Among the various types of flat panel display devices, liquid crystal display (LCD) devices are widely used for laptop computers and desktop computer monitors because of their superiority in resolution, color image display, and display quality.

Optical anisotropy and polarization characteristics of liquid crystal molecules are utilized to generate desirable images. Liquid crystal molecules have specific alignment directions that result from their own peculiar characteristics. The specific alignment can be modified by electric fields that are applied upon the liquid crystal molecules. In other words, the electric fields applied upon the liquid crystal molecules can change the alignment of the liquid crystal molecules. Due to the optical anisotropy, the incident light is refracted according to the alignment of the liquid crystal molecules.

Specifically, the LCD devices include upper and lower substrates having electrodes that are spaced apart and face into each other, and a liquid crystal material is interposed therebetween. Accordingly, when a voltage is applied to the liquid crystal material through the electrodes of each substrate, an alignment direction of the liquid crystal molecules is changed in accordance with the applied voltage, thereby displaying images. By controlling the applied voltage, the LCD device provides various light transmittances to display image data.

The liquid crystal display (LCD) devices are widely applied in office automation (OA) and video equipment due to their characteristics such as light weight, slim design, and low power consumption. Among different types of LCD devices, active matrix LCDs (AM-LCDs) having thin film transistors and pixel electrodes arranged in a matrix form provide high resolution and superiority in displaying moving images. A typical LCD panel has an upper substrate, a lower substrate, and a liquid crystal layer interposed therebetween. The upper substrate (referred to as a color filter substrate) includes a common electrode and color filters. The lower substrate (referred to as an array substrate) includes thin film transistors (TFT's) as switching elements and pixel electrodes.

As previously described, the operation of an LCD device is based on the principle that the alignment direction of liquid crystal molecules varies with applied electric fields between the common electrode and the pixel electrode. Accordingly, the liquid crystal molecules function as an optical modulation element having variable optical characteristics that depend upon the polarity of the applied voltage.

FIG. 1 is an expanded perspective view illustrating a related art active matrix liquid crystal display device. As shown in FIG. 1, the LCD device 11 includes an upper substrate 5 (referred to as a color filter substrate) and a lower substrate 22 (referred to as an array substrate) having a liquid crystal layer 14 interposed therebetween. On the upper substrate 5, a black matrix 6 and a color filter layer 8 are formed in an array matrix including a plurality of red (R), green (G), and blue (B) color filters surrounded by corresponding portions of the black matrix 6. Additionally, a common electrode 18 is formed on the upper substrate 5 and covers the color filter layer 8 and the black matrix 6.

On the lower substrate 22, a plurality of thin film transistors T are formed in a shape of an array matrix corresponding to the color filter layer 8. A plurality of gate lines 13 and data lines 15 perpendicularly cross one another such that each TFT T is located adjacent to each intersection of the gate lines 13 and the data lines 15. Furthermore, a plurality of pixel electrodes 17 are formed on a pixel region P defined by the gate lines 13 and the data lines 15 of the lower substrate 22. The pixel electrode 17 is formed of a transparent conductive material having high transmissivity, such as indium-tin-oxide (ITO) or indium-zinc-oxide (IZO).

Still in FIG. 1, a storage capacitor $C_{ST}$ is disposed to correspond to each pixel P and connected in parallel to each pixel electrode 17. The storage capacitor $C_{ST}$ is comprised of a portion of the gate line 13 as a first capacitor electrode, a storage metal layer 30 as a second capacitor electrode, and an interposed insulator (shown as reference numeral 16 of FIG. 2). Since the storage metal layer 30 is connected to the pixel electrode 17 through a contact hole, the storage capacitor $C_{ST}$ electrically contacts the pixel electrode 17.

In the related art LCD device shown in FIG. 1, a scanning signal is applied to the gate electrode of the thin film transistor T through the gate line 13, and a data signal is applied to the source electrode of the thin film transistor T through the data line 15. As a result, the liquid crystal molecules of the liquid crystal material layer 14 are aligned and arranged by the operation of the thin film transistor T, and the incident light passing through the liquid crystal layer 14 is controlled to display an image. However, since the pixel and common electrodes 17 and 18 are positioned on the upper and lower substrates 5 and 22, respectively, the electric fields induced between the upper and lower substrates 5 and 22 are perpendicular to the surfaces of the upper and lower substrates 5 and 22.

When fabricating the LCD device 11 of FIG. 1, the upper substrate 5 is aligned with and attached to the lower substrate 22. In this process, the upper substrate 5 may be misaligned with respect to the lower substrate 22 and a light leakage may occur in the completed LCD device 11 due to an error margin in attaching the upper and lower substrates 5 and 22.

FIG. 2 is a schematic cross-sectional view taken along line II—II of FIG. 1 and illustrates a pixel of the related art liquid crystal display device.

As shown in FIG. 2, the related art LCD device includes the upper substrate 5, the lower substrate 22, and the liquid crystal layer 14. The upper and lower substrates 5 and 22 are spaced apart from each other, and the liquid crystal layer 14 is interposed therebetween. The upper and lower substrates 5 and 22 are often referred to as an array substrate and a color filter substrate, respectively, because the color filter layer 8 is formed upon the upper substrate and a plurality of array elements are formed on the lower substrate 22.

In FIG. 2, the thin film transistor T is formed on the front surface of the lower substrate 22. The thin film transistor T includes a gate electrode 32, an active layer 34, a source electrode 36, and a drain electrode 38. Between the gate electrode 32 and the active layer 34, a gate insulation layer 16 is interposed to protect the gate electrode 32 and the gate line 13. As shown in FIG. 1, the gate electrode 32 extends from the gate line 13 and the source electrode 36 extends from the data line 15. All of the gate, source, and drain electrodes 32, 36, and 38 are formed of a metallic material while the active layer 34 is formed of silicon. A passivation layer 40 is formed on the thin film transistor T for protection. In the pixel region P, the pixel electrode 17 formed of a transparent conductive material is disposed on the passivation layer 40 and contacts the drain electrode 38 and the storage metal layer 30.

Meanwhile, as mentioned above, the gate electrode 13 acts as a first electrode of the storage capacitor $C_{ST}$ and the storage metal layer 30 acts as a second electrode of the storage capacitor $C_{ST}$. Thus, the gate electrode 13 and the storage metal layer 30 constitute the storage capacitor $C_{ST}$ with the interposed gate insulation layer 16.

Still referring to FIG. 2, the upper substrate 5 is spaced apart from the lower substrate 22 over the thin film transistor T. On the rear surface of the upper substrate 5, a black matrix 6 is disposed in a position corresponding to the thin film transistor T and the gate line 13. The black matrix 6 is formed on the entire surface of the upper substrate 5 and has openings corresponding to the pixel electrode 17 of the lower substrate 22, as shown in FIG. 1. The black matrix 6 prevents a light leakage in the LCD panel except for the portion for the pixel electrode 17. The black matrix 6 protects the thin film transistor T from the light such that the black matrix 6 prevents generation of a photo-current in the thin film transistor T. The color filter layer 8 is formed on the rear surface of the upper substrate 5 to cover the black matrix 6. Each of the color filters 8 has one of the red, green, and blue colors and corresponds to one pixel region P where the pixel electrode 17 is located. A common electrode 18 formed of a transparent conductive material is disposed on the color filter layer 8 over the upper substrate 5.

In the related art LCD panel mentioned above, the pixel electrode 17 has a one-to-one correspondence with one of the color filters. Furthermore, in order to prevent a cross-talk between the pixel electrode 17 and the gate and data lines 13 and 15, the pixel electrode 17 is spaced apart from the data line 15 by the distance A and from the gate line 13 by the distance B, as shown in FIG. 2. The open spaces A and B between the pixel electrode 17 and the data and gate line 15 and 13 cause a malfunction such as a light leakage in the LCD device. Namely, the light leakage mainly occurs in the open spaces A and B so that the black matrix 6 formed on the upper substrate 5 should cover the open spaces A and B. However, when the upper substrate 5 is arranged with the lower substrate 22 or vice versa, a misalignment may occur between the upper substrate 5 and the lower substrate 22. Therefore, the black matrix 6 is extended to completely cover the open spaces A and B. That is, the black matrix 6 is designed to provide an aligning margin to prevent a light leakage. However, in the case of extending the black matrix, an aperture ratio of a liquid crystal panel is reduced as much as the aligning margin of the black matrix 6. Moreover, if there are errors in the aligning margin of the black matrix 6, a light leakage still occurs in the open spaces A and B, and deteriorates the image quality of an LCD device.

To overcome the above-mentioned problem, the lower substrate of the liquid crystal display device has been researched to have a top gate type thin film transistors. FIG. 3 is a cross-sectional view illustrating a pixel of an array substrate including a top gate type thin film transistor according to the related art.

As shown in FIG. 3, a buffer layer is disposed on a transparent substrate 1. A semiconductor layer 54 and a first capacitor electrode 56 are formed on the buffer layer. The semiconductor layer 54 and the first capacitor electrode 56 are formed of polycrystalline silicon. The semiconductor layer 54 is divided into the active region C, the source region D, and the drain region E, wherein the source region D and the drain region E are doped by a dopant, such as p-type or n-type ions. Further, the first capacitor electrode 56 is a region where the dopant (p-type or n-type ions) is applied. A gate insulation layer 58 is then disposed on the buffer layer to cover the semiconductor layer 54 and the first capacitor electrode 56.

A gate electrode 60 and a second capacitor electrode 62 are formed on the gate insulation layer 58. The gate electrode 60 corresponds to the active region C of the semiconductor layer 54, and the second capacitor electrode 62 corresponds to the first capacitor electrode 56. The first and second capacitor electrodes 56 and 62 constitute a storage capacitor $C_{ST}$ with the gate insulation layer 58 interposed therebetween.

An interlayer insulator 64 is formed on the gate insulation layer 58 while covering the gate electrode 60 and the second capacitor electrode 62. Both the interlayer insulator 64 and the gate insulation layer 58 have first, second, and third contact holes 66a, 66b, and 66c. The first contact hole 66a exposes the source region D of the semiconductor layer 54, the second contact hole 66b exposes the drain region E of the semiconductor layer 54, and the third contact hole 66c exposes the first capacitor electrode 56.

On the interlayer insulator 64, source and drain electrodes 68 and 70 are formed to contact the source and drain regions D and E, respectively. Further, a data line 69 connected to the source electrode 68 is also disposed on the interlayer insulator 64. The source electrode 68 extends from the data line 69 and contacts the source region D of the semiconductor layer 54 through the first contact hole 66a. The drain electrode 70 is spaced apart from and faces into the source electrode 68 across the gate electrode 60, and contacts the drain region E of the semiconductor layer 54 through the second contact hole 66b.

Accordingly, a top gate type thin film transistor T is formed over the transparent substrate 50. Additionally, an auxiliary capacitor electrode 72 is formed on the interlayer insulator 64 over the storage capacitor $C_{ST}$ SO that the auxiliary capacitor electrode 72 contacts the first capacitor electrode 56 through the third contact hole 66c. A passivation layer 78, which is covering the top gate type thin film transistor T and the storage capacitor $C_{ST}$, is disposed on the interlayer insulator 64. The passivation layer 78 has a drain contact hole 74 exposing the drain electrode 70 and a storage contact hole 76 exposing the auxiliary capacitor electrode 72. A pixel electrode 80 is formed on the passivation layer while contacting both the drain electrode 70 through the drain contact hole 74 and the auxiliary capacitor electrode 72 through the storage contact hole 76.

When using this array substrate of FIG. 3 having the top gate type thin film transistor T, the upper substrate corresponding to the array substrate still needs a black matrix to prevent a light leakage. Further, when the array substrate and the upper substrate are attached to each other, the two substrates may still be misaligned so that a light leakage cannot be improved and an aperture ratio still decreases. Moreover, since the color filters and the black matrix are formed on the upper substrate and the lower and upper substrates are aligned and attached to each other, the manufacturing process becomes complicated.

SUMMARY OF THE INVENTION

Accordingly, the present invention is directed to an array substrate of a liquid crystal display device having a color filter on a thin film transistor (COT) structure and a fabricating method of the same that substantially obviate one or more of problems due to limitations and disadvantages of the related art.

Another object of the present invention is to provide an array substrate for a liquid crystal display device, which provides a high aperture ratio.

Another object of the present invention is to provide a method of forming an array substrate for a liquid crystal display device, which simplifies the manufacturing process and increases the manufacturing yield.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device having a COT structure array substrate includes a top gate type thin film transistor formed on a substrate and having an active layer, a gate electrode, a source electrode, and a drain electrode, a storage capacitor adjacent to the top gate type thin film transistor and having a first storage electrode and a second storage electrode, a black matrix on the top gate type thin film transistor, a first pixel electrode at a pixel region and contacting the drain electrode, a color filter on the first pixel electrode at the pixel region, and a second pixel electrode on the color filter and contacting the first pixel electrode at a portion over the black matrix.

In another aspect of the present invention, a method of forming a liquid crystal display device having a COT structure array substrate includes forming a top gate type thin film transistor formed on a substrate and having an active layer, a gate electrode, a source electrode, and a drain electrode, forming a storage capacitor adjacent to the top gate type thin film transistor and having a first storage electrode and a second storage electrode, forming a black matrix on the top gate type thin film transistor, forming a first pixel electrode at the pixel region and contacting the drain electrode, forming a color filter on the first pixel electrode at the pixel region, and forming a second pixel electrode on the color filter and contacting the first pixel electrode at a portion over the black matrix.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings:

FIGS. 7A to 7I are cross-sectional views illustrating the process steps for fabricating the array substrate having the top gate type thin film transistor and the color filter on thin film transistor (COT) structure according to the present invention.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 4:
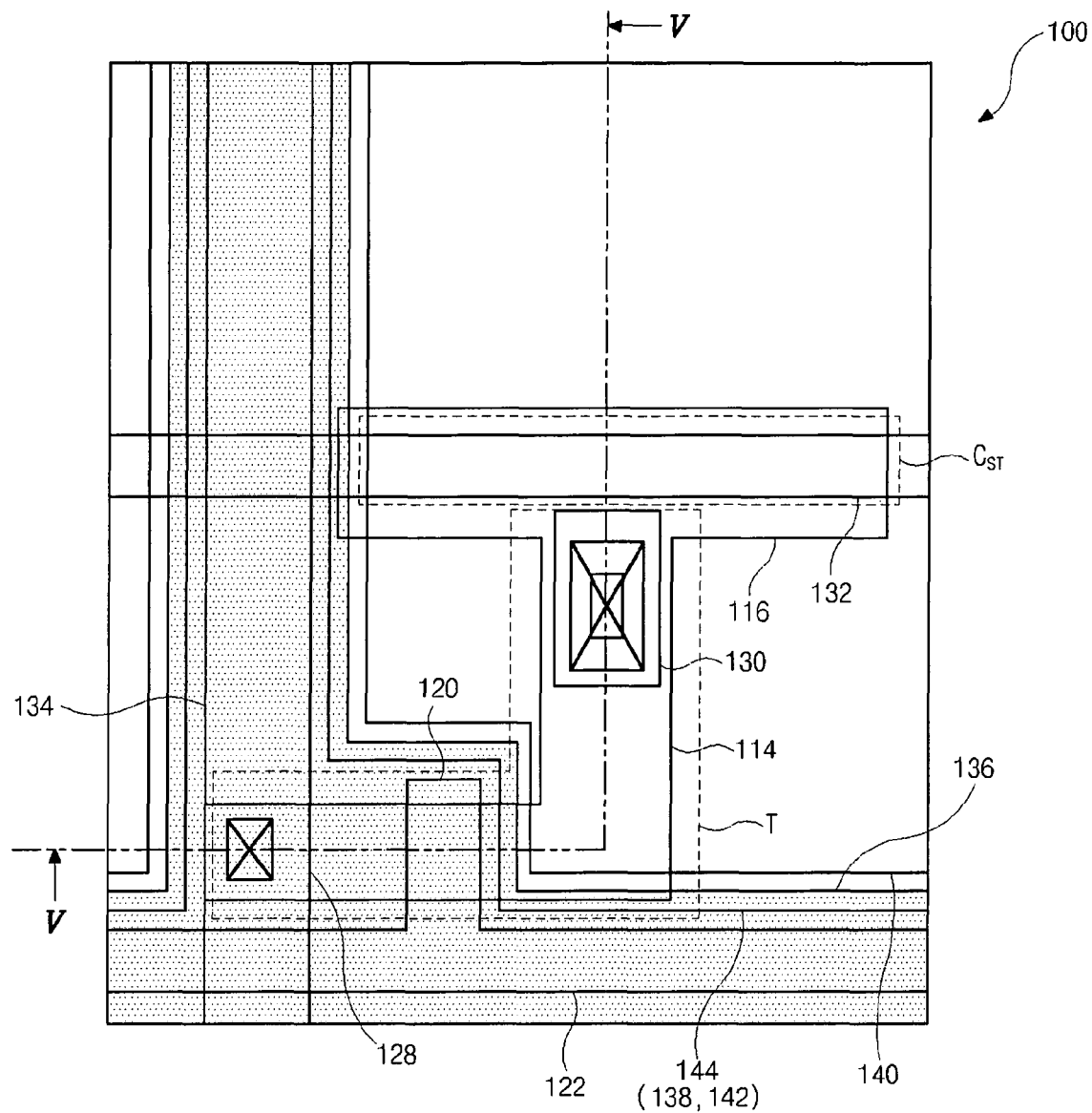
FIG. 4 is a partially enlarged plane view of an array substrate having a color filter on thin film transistor structure and illustrates a top gate type thin film transistor according to the present invention.

FIG. 4 is a partially enlarged plane view of an array substrate having a color filter on thin film transistor structure and illustrates a top gate type thin film transistor according to the present invention.

As shown in FIG. 4, an array substrate 100 includes a gate line 122 disposed in the transverse direction and a data line 134 disposed in the longitudinal direction. The gate line 122 and the data lines 134 cross each other and define a pixel region. A top gate type thin film transistor T is formed at each crossing portion of the gate line 122 and the data line 134. The thin film transistor T includes a gate electrode 120, an active layer 114, a source electrode 128, and a drain electrode 130.

In the top gate type thin film transistor T of the present invention, the source electrode 128 is a part of the data line 134, which is near the crossing portion of the gate and data lines 122 and 134. Especially, the active layer 114 of the present invention has an L-shape extending in the transverse direction and then bending toward the longitudinal direction. At the end of the L-shaped active layer 114, a first storage electrode (not shown) is connected thereto. The gate electrode 120 extends over the transverse part of the active layer 114, and the drain electrode 130 is disposed over the longitudinal part of the active layer 114. Also the transverse part of the active layer 114 extends underneath the source electrode 128. In the top gate type thin film transistor T of the present invention, the L-shaped active layer 114 is formed of polycrystalline silicon.

In the pixel regions defined by the gate line 122 and the data line 134, a color filter 140 is located therein. Additionally, a double-layered pixel electrode 144 (referred to as a sandwich pixel electrode) is disposed at each pixel region. A first pixel electrode 138 and a second pixel electrode 142, which constitute the double-layered pixel electrode 144, have the same shape. The first pixel electrode 128 is disposed beneath the color filter 140 and contacts the drain electrode 130, and the second pixel electrode 142 is disposed on the color filter 140 and contacts the first pixel electrode 138. The color filter 140 is located between the first and second pixel electrodes 138 and 142, and the second pixel electrode 142 electrically contacts the drain electrode 130 through a contact hole.

Meanwhile, a storage capacitor $C_{ST}$ is disposed next to the top gate type thin film transistor T including a first storage electrode 116 and a second storage electrode 132. The first storage electrode 116 is connected to the active layer 114 with the same material of polycrystalline silicon. The second storage electrode 132 is formed of the same material as the source and drain electrodes 128 and 130. The double-layered pixel electrode 144 electrically contacts the first storage electrode 116 through the drain electrode 130, so that the double-layered pixel electrode 144 is electrically communicated with the storage capacitor $C_{ST}$ in parallel.

The array substrate 100 of FIG. 4 has a color filter on thin film transistor (COT) structure. In such a COT structure, a black matrix 136 and the color filters 140 are formed on the array substrate 100. The black matrix 136 is disposed to correspond to the thin film transistor T and the gate line 122 and the data line 134, so that it prevents a light leakage in the LCD device. The black matrix 136 is formed of an opaque organic material, thereby blocking the light to prevent the light leakage. Also, it protects the thin film transistors T from the external impact.

Figure 5:
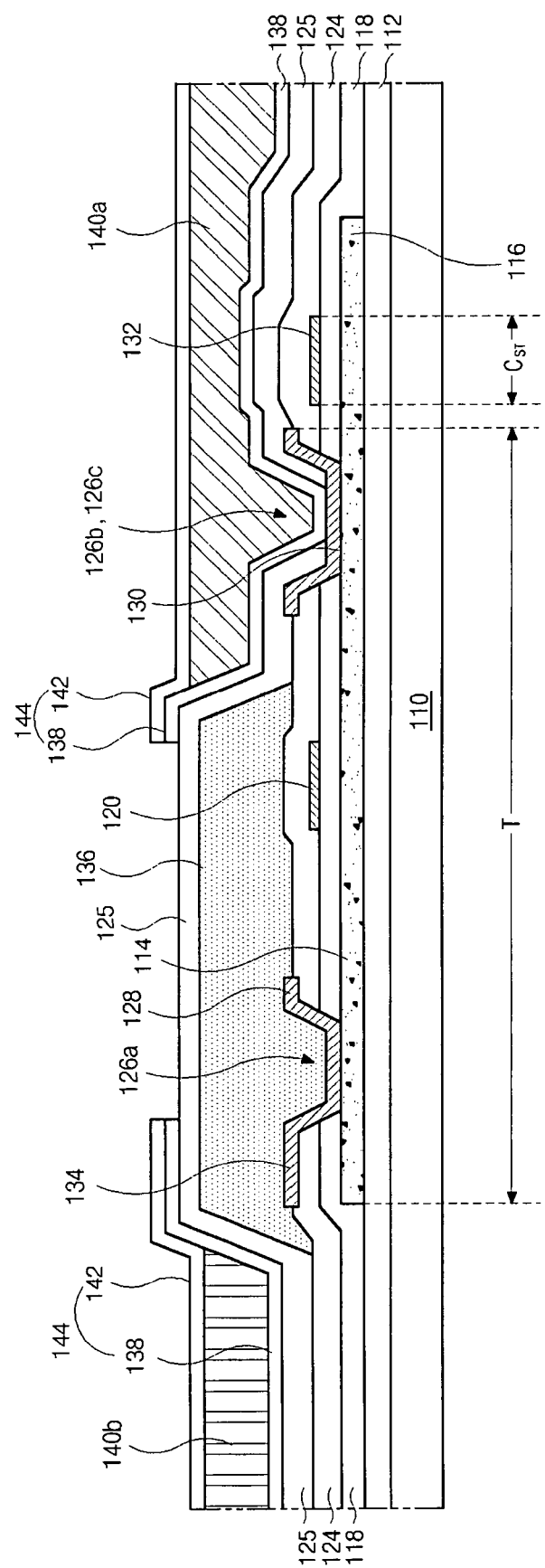
FIG. 5 is a cross-sectional view taken along line V—V of FIG. 4 according to the present invention.

FIG. 5 is a cross-sectional view taken along line V—V of FIG. 4 according to the present invention.

Figure 1:
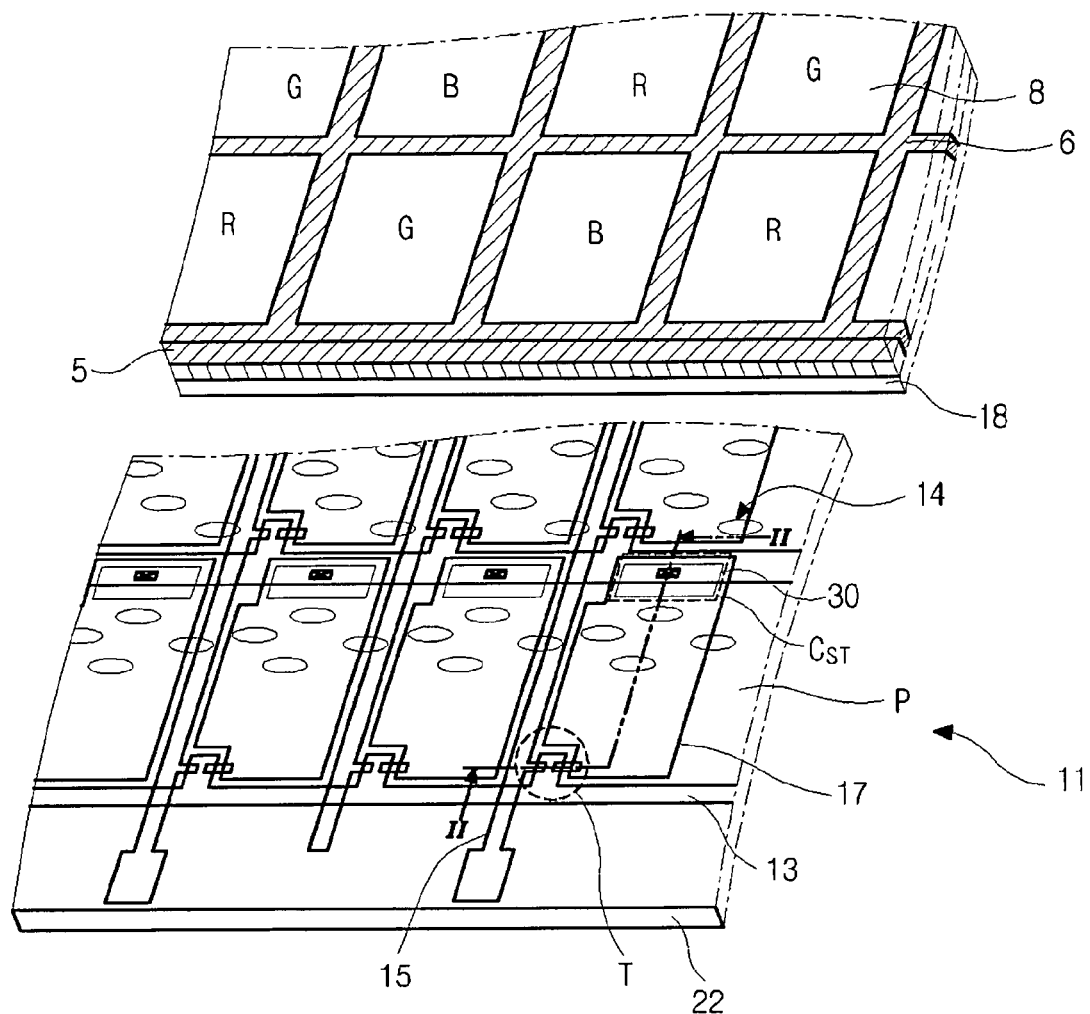
FIG. 1 is an expanded perspective view illustrating a related art liquid crystal display device.
Figure 2:
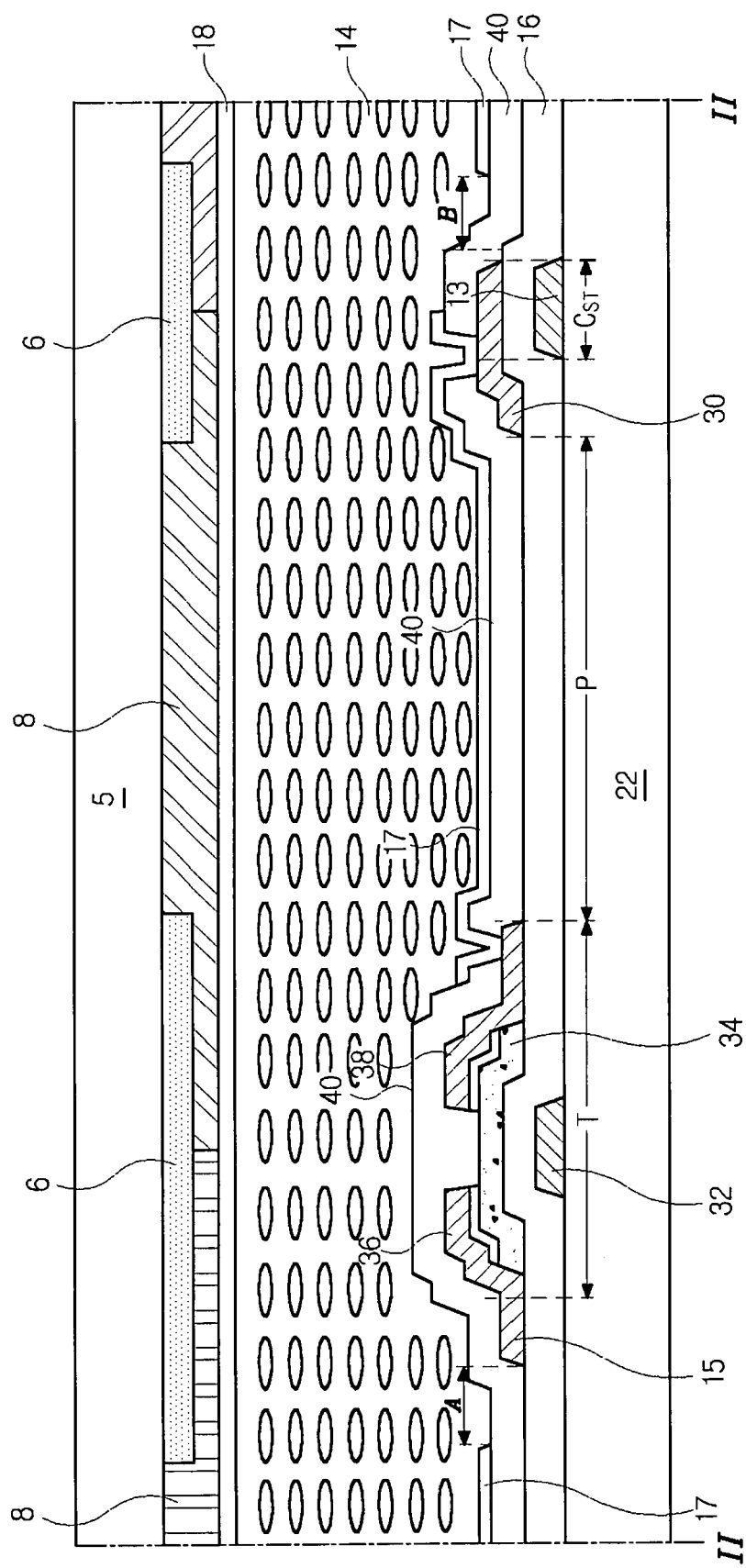
FIG. 2 is a schematic cross-sectional view taken along line II—II of FIG. 1 and illustrates a pixel of the related art liquid crystal display device.
Figure 3:
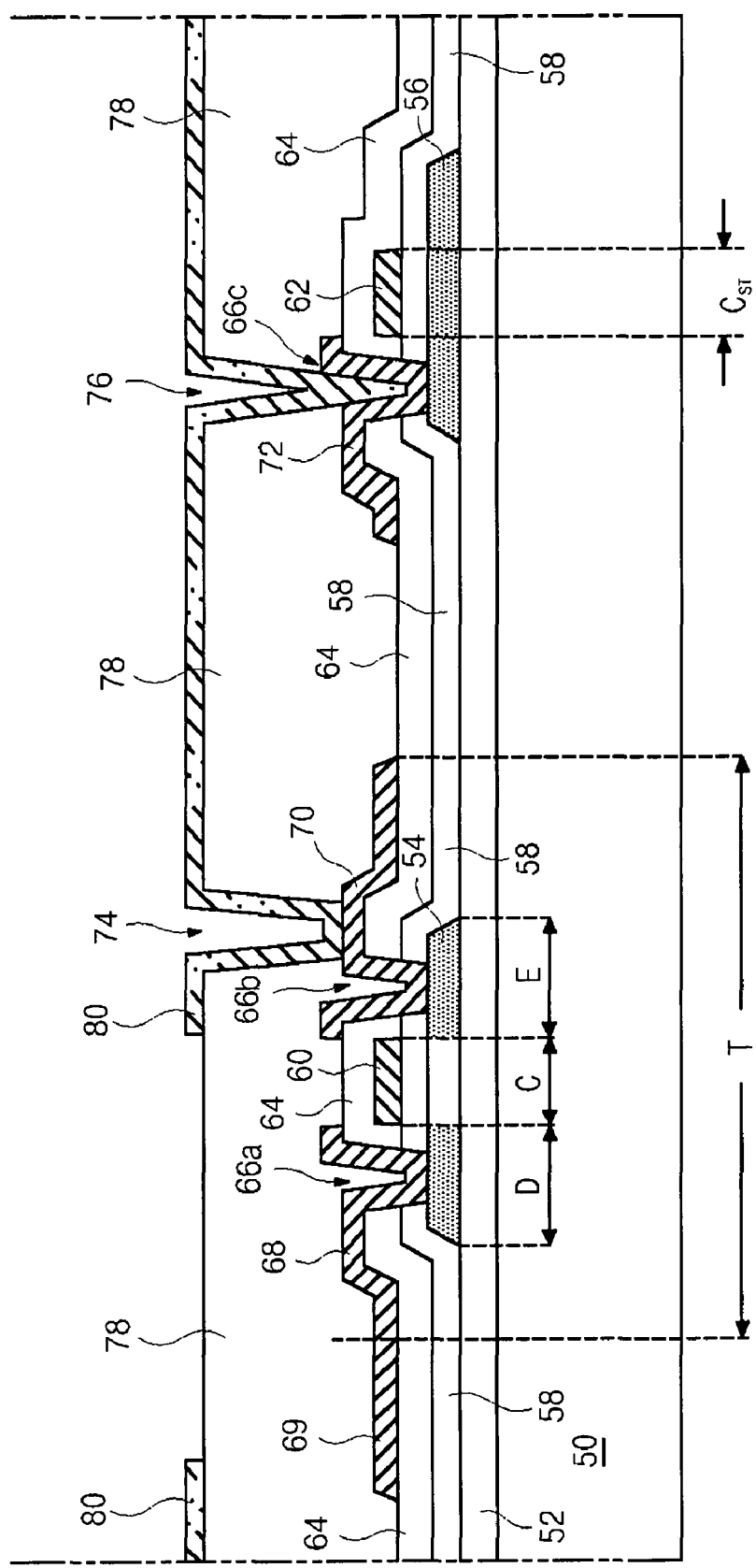
FIG. 3 is a cross-sectional view illustrating a pixel of an array substrate including a top gate type thin film transistor according to the related art.

In FIG. 5, a buffer layer 112 is formed on a transparent substrate 110, and then the active layer 114 and the first storage electrode 116 are placed on the buffer layer 112. As described above, the active layer 114 and the first storage electrode 116 are connected to each other as a single body and formed of polycrystalline silicon. The active layer 114 and the first storage electrode 116 are doped by a dopant except for the portion corresponding to the gate electrode 120. A gate insulation layer 118 is formed on the buffer layer 112, the active layer 114, and the first storage electrode 116. Then, the gate electrode 120 and the second storage electrode 132 are disposed on the gate insulation layer 118. The gate electrode 120 is formed over the active layer 114, and the second storage electrode 132 is formed over the first storage electrode 116. As shown in FIG. 3, the gate line 122 connected to the gate electrode 120 is also placed on the gate insulation layer 118. An interlayer insulator 124 is disposed on the gate insulation layer 118 to cover the gate electrode 120 and the second storage electrode 132. First and second contact holes 126a and 126b are formed to penetrate both the gate insulation layer 118 and the interlayer insulator 124. Then, the source electrode 128 and the drain electrode 130 are formed on the interlayer insulator 124. The source and drain electrodes 128 and 130 contact the active layer 114 through the first and second contact holes 126a and 126b, respectively. The data line 134 connected to the source electrode 128 is also formed on the interlayer insulator 124. Thus, the top gate type thin film transistor T is complete.

Now referring to FIGS. 4 and 5, a black matrix 136 is disposed on the interlayer insulator 124. The black matrix 136 is formed to overlap the gate and source electrodes 120 and 128 and the gate and data lines 122 and 134, so that the black matrix 136 has openings each corresponding to the pixel region defined by the intersections of the gate and data lines 122 and 134. Over the entire surface of the transparent substrate 110, a passivation layer 125 is formed to cover the black matrix 136 and the drain electrode 130. A third contact hole 126c is formed through the passivation layer 125 to expose a portion of the drain electrode 130. Then, the first pixel electrode 138 is disposed on the passivation layer 125 and contacts the drain electrode 130 through the third contact hole 126c. On the first pixel electrode 138, the color filters 140a and 140b are formed. Each color filter 140 is disposed in the openings of the black matrix 136 corresponding to the pixel regions. The color filters 140 have red (R), green (G), and blue (B) colors, and the red (R), green (G), and blue (B) color filters 140 are alternately disposed within the pixel regions. The second pixel electrode 142 is formed on the color filters 140 and contacts the first pixel electrode 138. Since the second pixel electrode 142 is connected to the first pixel electrode 138, the second pixel electrode 142 electrically communicates with the drain electrode 130 of the top gate type thin film transistor T. Accordingly, the array substrate having a color filter on thin film transistor (COT) structure is complete. Furthermore, as shown in FIG. 5, the array substrate has a double-layered pixel electrode with the color filter 140 interposed between the first and second pixel electrodes 138 and 142.

Figure 6:
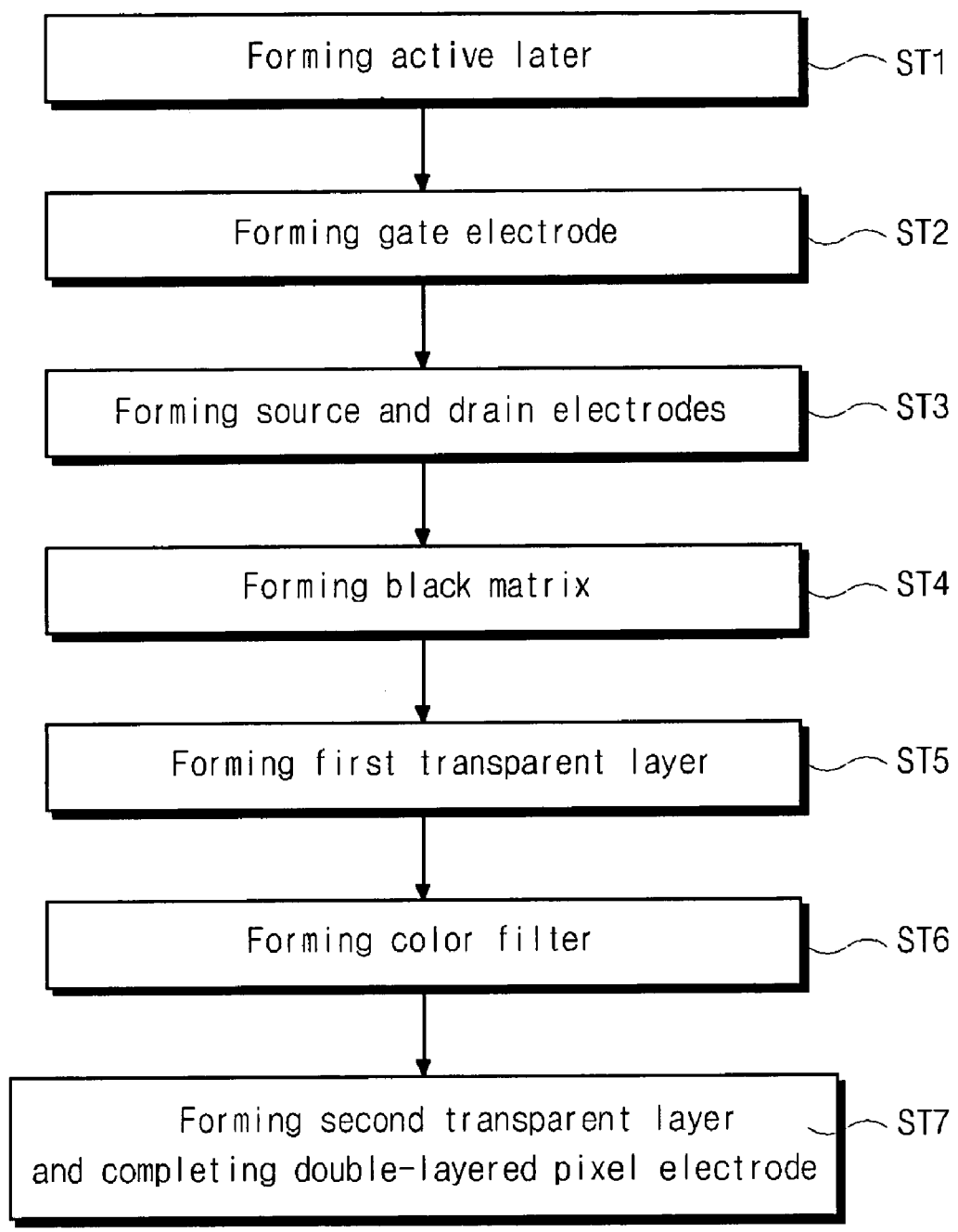
FIG. 6 is a flow chart illustrating the process steps for fabricating an array substrate having a top gate type thin film transistor and a color filter on thin film transistor (COT) structure according to the present invention.

The fabrication process of forming the above-mentioned array substrate having a COT structure will be explained with reference to FIGS. 6 and 7A to 7I as follows. FIG. 6 is a flow chart illustrating process steps for fabricating an array substrate having a top gate type thin film transistor and a color filter on thin film transistor (COT) structure according to the present invention. And FIGS. 7A to 7I are cross-sectional views illustrating the process steps for fabricating the array substrate having the top gate type thin film transistor and the color filter on thin film transistor (COT) structure according to the present invention.

In step ST1 of FIG. 6 and with reference to FIG. 7A, the buffer layer 112 is formed on the transparent substrate 110. And then, the active layer 114 and the first storage electrode 116 are formed on the buffer layer 112. The active layer 114 and the first storage electrode 115 are formed of polycrystalline silicon. In forming the active layer 114 and the first storage electrode 116, for example, an amorphous silicon layer is first formed on the buffer layer 112, and the amorphous silicon layer is dehydrogenated and then crystallized. Thereafter, the crystallized silicon layer is patterned to form the active layer 114 and the first storage electrode 116. Alternatively, the active layer 114 and the first storage electrode 116 can be formed by thermally crystallizing the amorphous silicon layer on the buffer layer 112. Since the polycrystalline silicon has a high carrier mobility, a thin film transistor having a polycrystalline active layer can have excellent electrical characteristics.

In step ST2 and with reference to FIG. 7B, the gate insulation layer 118 is formed on the buffer layer 112 to cover the active layer 114 and the first storage electrode 116. Thereafter, the gate electrode 120 and the second storage electrode 132 are formed on the gate insulation layer 118 above the active layer 114 and the first storage electrode 116, respectively. At this point, the active layer 114 and the first storage electrode 116 are doped by a dopant, such as p-type ions and/or n-type ions, except for the portion corresponding to the gate electrode 120.

Thereafter, as shown in FIG. 7C, the interlayer insulator 124 is formed on the gate insulation layer 118 to cover the gate electrode 120 and the second storage electrode 132. Both the gate insulation layer 118 and the interlayer insulator 124 are then patterned to form the first contact hole 126a and the second contact hole 126b which respectively expose the left portion of the active layer 114 and the right portion of the active layer 114. Especially, the second contact hole 126b is disposed between the gate electrode 120 and the second storage electrode 132.

Now in step ST3 and with reference FIG. 7D, the source electrode 128 is formed on the interlayer insulator 124 to contact the active layer 114 through the first contact hole 126a. Simultaneously, the drain electrode 130 is formed on the interlayer insulation 124 to contact the active layer 114 through the second contact hole 126b. At this time, the data line 134 is also formed on the interlayer insulator 124 perpendicularly crossing the gate line 122, as shown in FIG. 4. The source electrode 128 extends from the data line 134 and the drain electrode 130 is spaced apart from the source electrode 128.

Figure 7E:
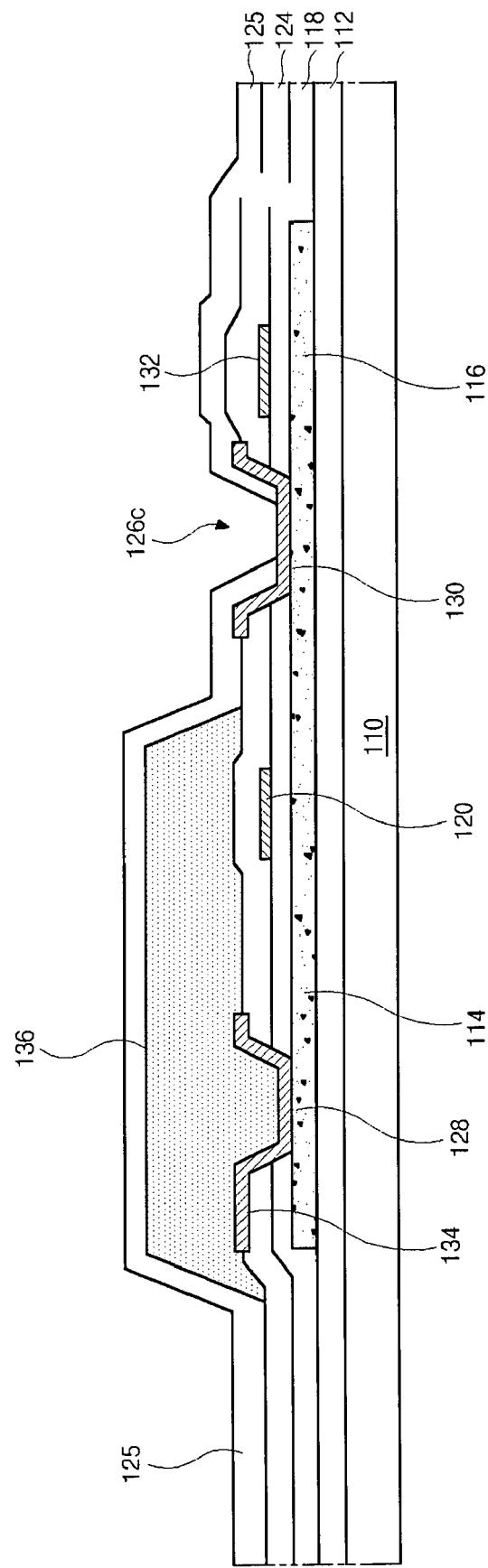

In step ST4 and with reference FIG. 7E, the black matrix 136 is formed on the interlayer insulator 124. The black matrix 136 covers the source electrode 128, the gate electrode 120, the data line 134, and the gate line 122, as shown in FIG. 4. Additionally, the black matrix 136 has openings each exposing and corresponding to the pixel region defined by the gate and data lines 122 and 134. The black matrix 136, may be formed of an insulating material having a black color, such as black resin. After forming the black matrix 136, the passivation layer 125 is formed over the entire surface of the transparent substrate 110 so that it covers the black matrix 136 and the drain electrode 130. Thereafter, the passivation layer 125 is patterned to form the third contact hole 126c to expose a portion of the drain electrode 130, as shown in FIG. 7F.

Figure 7F:
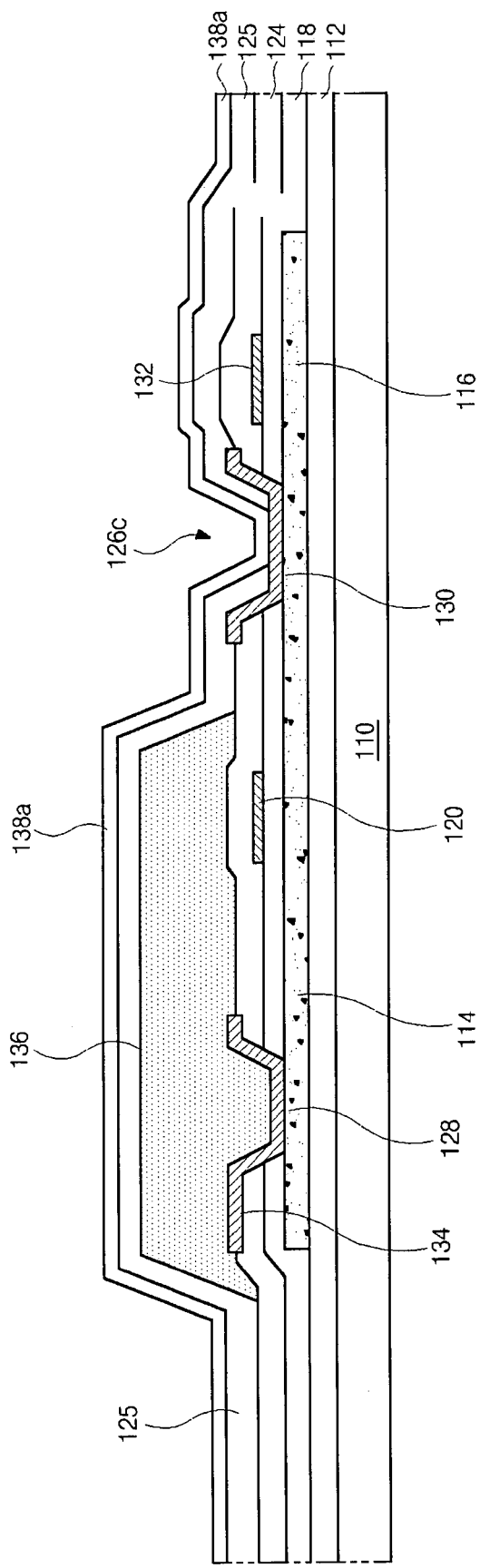

In step ST5 and with reference to FIG. 7F, a first transparent layer 138a is formed on the entire surface of the passivation layer 125. Thus, the first transparent layer 138a contacts the drain electrode 130 through the third contact hole 126c.

Figure 7G:
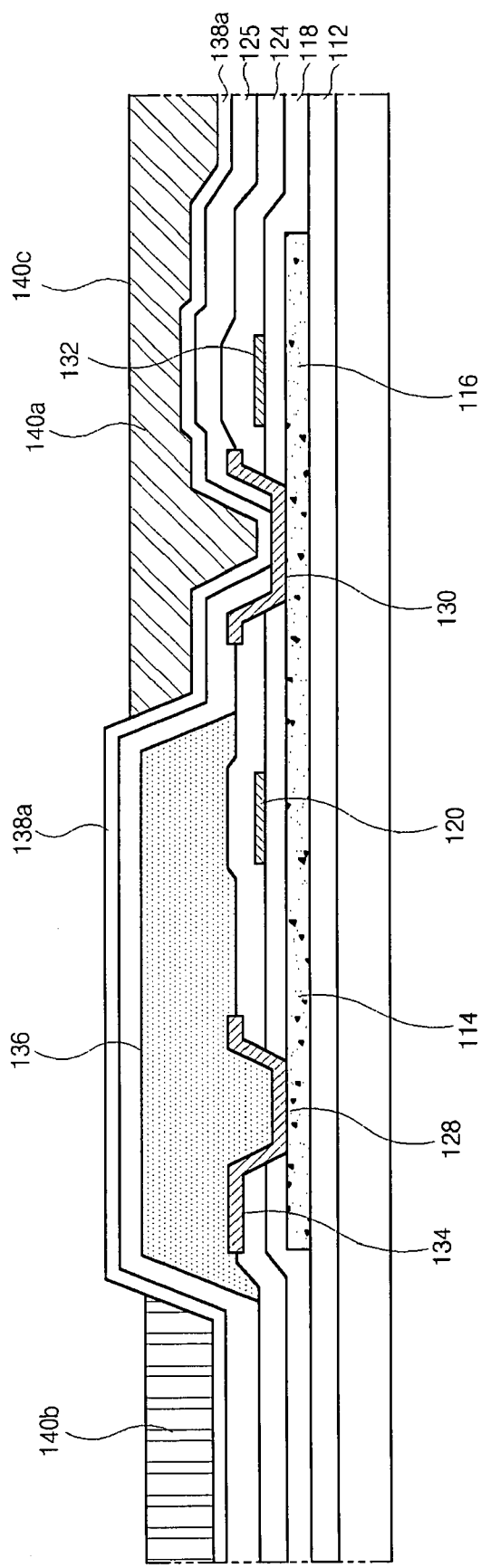

Next, in step ST6 and with reference to FIG. 7G, the color filters 140 are formed on the first transparent layer 138a. Especially, each color filter 140a or 140b is formed to be disposed in each pixel region that corresponds to the openings of the black matrix 136. Thus, the color filters 140 are divided by the black matrix 136. Namely, the color filters 140 do not exist above the black matrix 136. The color filters 140 have red (R), green (G), and blue (B) colors in an alternate order.

Figure 7H:
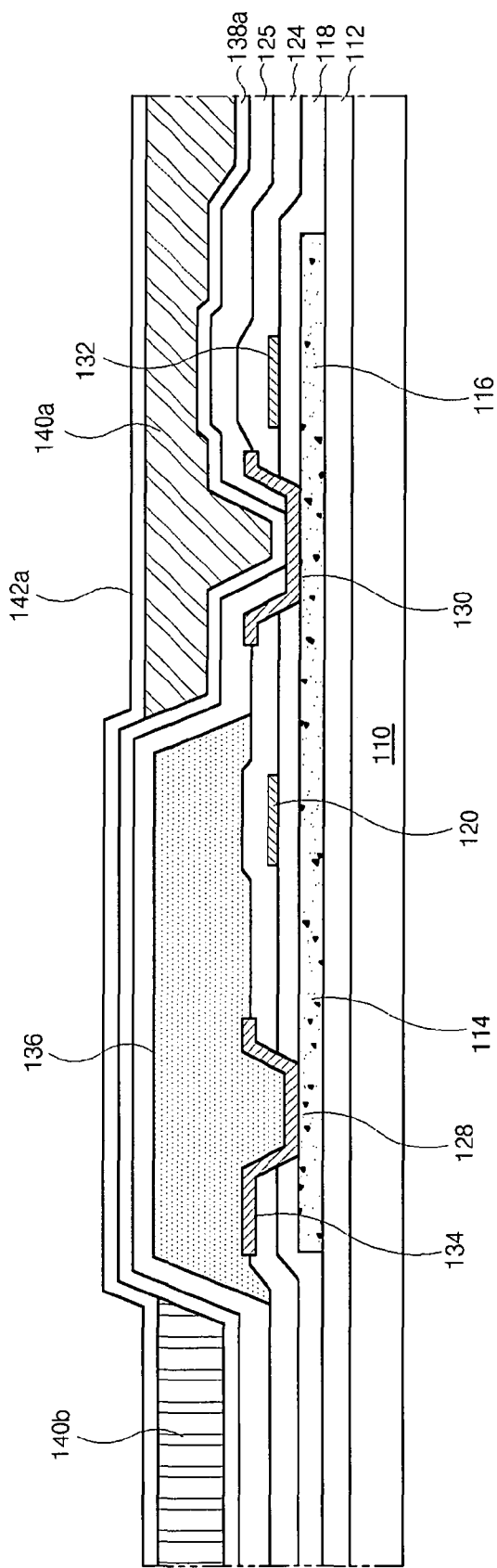
Figure 7I:
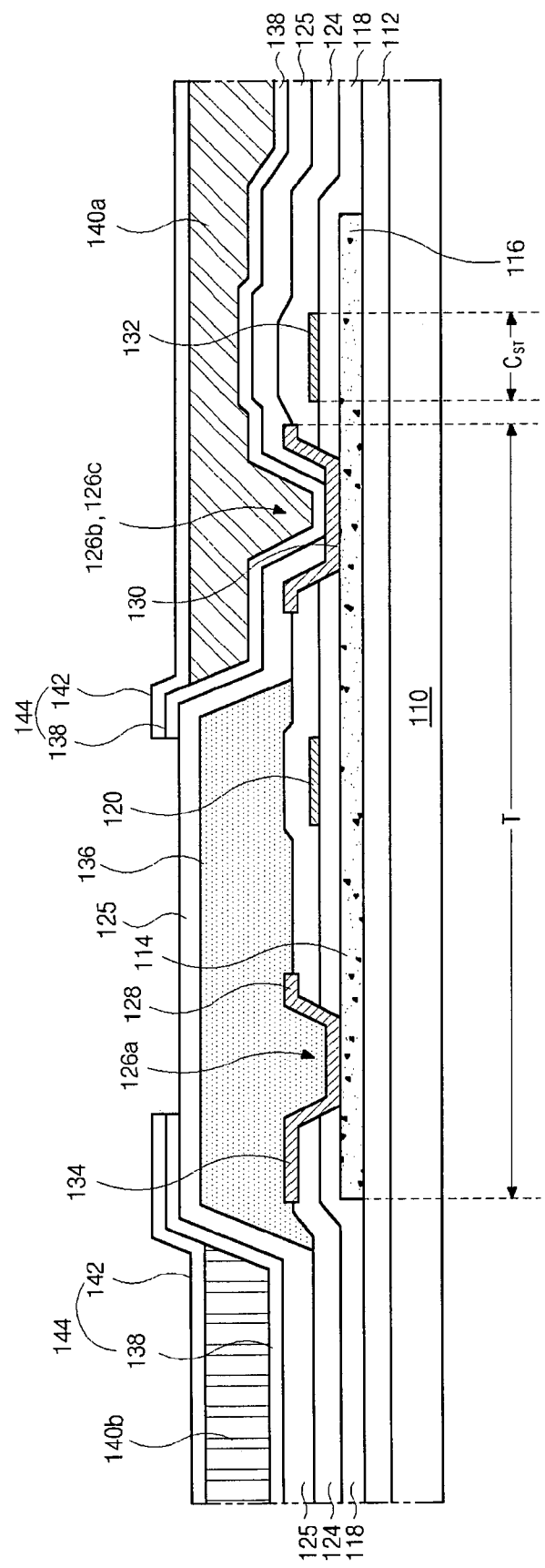

In step ST7 and FIGS. 7H and 7I, a second transparent layer 142a is formed on the color filters 140 and on the exposed surface of the first transparent layer 138a. In the present invention, the first and second transparent layers 138a and 142a may be formed of indium-tin-oxide and/or indium-zinc-oxide, for example. After forming the second transparent layer 142a, the first and second transparent layers 138a and 142a are simultaneously patterned to form the double-layered pixel electrode 144 (referred as a sandwich pixel electrode), as shown in FIG. 7I. The first and second transparent electrode layers 138a and 142a are simultaneously patterned with the same mask, so that the sandwich pixel electrode is formed corresponding to each pixel region. Alternatively, the first transparent electrode layers 138a may be patterned and then the color filters formed thereon. Thereafter, the second transparent electrode layer 142a may be patterned. The sandwich pixel electrode 144 is comprised of the first pixel electrode 138 and the second pixel electrode 142. Therefore, the color filter 140 is interposed between the first and second pixel electrodes 138 and 142, and the second pixel electrode 142 contacts the first pixel electrode 138 over the black matrix 136.

In the array substrate having a top gate type thin film transistor and a COT structure, the black matrix 136 and the color filters 140 are formed over the same substrate 110, so that the liquid crystal display device can have a high aperture ratio. Further, since the pixel electrode has a double-layered structure, the reliability in the fabrication process can be improved when fabricating the array substrate. Additionally, since the black matrix 136 is disposed over the data line 134, a parasitic capacitance that may occur between the pixel electrode and the data line can be minimized.

According to the present invention, the COT structure array substrate has color filters as well as a black matrix. The opaque organic material over the thin film transistor acts not only as a black matrix but also as a TFT-protection layer. Therefore, the present invention can simplify the fabrication process and reduces the production cost. Furthermore, since the black matrix is formed on the array substrate, it is not required to consider an aligning margin when designing and aligning the lower and upper substrates, thereby increasing an aperture ratio.

It will be apparent to those skilled in the art that various modifications and variations can be made in the array substrate of the liquid crystal display device having a color filter on a thin film transistor structure and the method of fabricating the same of the present invention without departing from the spirit or scope of the inventions. Thus, it is intended that the present invention covers the modifications and variations of this invention provided they come within the scope of the appended claims and their equivalents.

What is claimed is:

1. A liquid crystal display device having a COT structure array substrate, comprising:
    a top gate type thin film transistor formed on a substrate and having an active layer, a gate electrode, a source electrode, and a drain electrode;
    a storage capacitor adjacent to the top gate type thin film transistor and having a first storage electrode and a second storage electrode;
    a black matrix on the top gate type thin film transistor;
    a first pixel electrode at a pixel region and contacting the drain electrode;
    a color filter on the first pixel electrode at the pixel region; and
    a second pixel electrode on the color filter and contacting the first pixel electrode at a portion over the black matrix,
    wherein a contact portion of the first pixel electrode and the second pixel electrode is directly over the black matrix.

2. The device according to claim 1, further comprising a buffer layer between the top gate type thin film transistor and the substrate.

3. The device according to claim 1, further comprising a gate insulation layer between the active layer and the gate electrode and between the first storage electrode and the second storage electrode.

4. The device according to claim 3, further comprising an interlayer insulator on the gate insulation layer, wherein the interlayer insulator covers the gate electrode and the second storage electrode.

5. The device according to claim 4, wherein the gate insulation layer and the interlayer insulator have a first contact hole and a second contact hole, respectively, each of the first and second contact holes exposing a portion of the active layer.

6. The device according to claim 5, wherein the source electrode contacts the active layer through the first contact hole, and the drain electrode contacts the active layer through the second contact hole.

7. The device according to claim 1, further comprising a passivation layer on the drain electrode and the black matrix.

8. The device according to claim 7, wherein the passivation layer has a third contact hole exposing a portion of the drain electrode.

9. The substrate according to claim 8, wherein the passivation layer is formed beneath the first pixel electrode contacting the drain electrode through the third contact hole.

10. The device according to claim 1, wherein the black matrix is formed of an insulating material having a black color.

11. The device according to claim 1, wherein the black matrix is formed of black resin.

12. The device according to claim 1, wherein the active layer has an L-shape.

13. The device according to claim 1, wherein the active layer is formed of a polycrystalline silicon layer.

14. The device according to claim 13, wherein the polycrystalline silicon layer is doped except for a portion corresponding to the gate electrode.

15. The device according to claim 1, wherein the first storage electrode is connected to the active layer as a single layer.

16. The device according to claim 1, wherein the second storage electrode is parallel to the gate line.

17. A method of forming a liquid crystal display device having a COT structure array substrate, comprising:
    forming a top gate type thin film transistor formed on a substrate and having an active layer, a gate electrode, a source electrode, and a drain electrode;
    forming a storage capacitor adjacent to the top gate type thin film transistor and having a first storage electrode and a second storage electrode;
    forming a black matrix on the top gate type thin film transistor;
    forming a first pixel electrode at the pixel region and contacting the drain electrode;
    forming a color filter on the first pixel electrode at the pixel region; and
    forming a second pixel electrode on the color filter and contacting the first pixel electrode at a portion over the black matrix,
    wherein a contact portion of the first pixel electrode and the second pixel electrode is directly over the black matrix.

18. The method according to claim 17, further comprising forming a buffer layer between the top gate type thin film transistor and the substrate.

19. The method according to claim 17, further comprising forming a gate insulation layer on the active layer and the gate electrode and between the first storage electrode and the second storage electrode.

20. The method according to claim 19, further comprising forming an interlayer insulator on the gate insulation layer, wherein the interlayer insulator covers the gate electrode and the second storage electrode.

21. The method according to claim 20, wherein the gate insulation layer and the interlayer insulator have a first contact hole and a second contact hole, respectively, each of the first and second contact holes exposing a portion of the active layer.

22. The method according to claim 21, wherein the source electrode contacts the active layer through the first contact hole, and the drain electrode contacts the active layer through the second contact hole.

23. The method according to claim 17, further comprising forming a passivation layer on the drain electrode and the black matrix.

24. The method according to claim 23, wherein the passivation layer has a third contact hole exposing a portion of the drain electrode.

25. The method according to claim 24, wherein the passivation layer is formed beneath the first pixel electrode contacting the drain electrode through the third contact hole.

26. The method according to claim 17, wherein the black matrix is formed of an insulating material having a black color.

27. The method according to claim 17, wherein the black matrix is formed of black resin.

28. The method according to claim 17, wherein the active layer has an L-shape.

29. The method according to claim 28, wherein the active layer is formed of a polycrystalline silicon layer.

30. The method according to claim 17, wherein the polycrystalline silicon layer is doped except for a portion corresponding to the gate electrode.

31. The method according to claim 17, wherein the first storage electrode is connected to the active layer as a single layer.

32. The method according to claim 17, wherein the second storage electrode is parallel with the gate line.

33. The method according to claim 17, wherein the forming first and second pixel electrodes comprises, depositing a first transparent layer over the substrate;
    depositing a second transparent layer over the first transparent layer; and
    patterning the first and second transparent layers at the same time.

* * * * *